United States Patent [19]

Fersing et al.

[11] Patent Number: 5,430,222
[45] Date of Patent: Jul. 4, 1995

[54] APPARATUS FOR THE CATALYTIC CRACKING IN THE FLUID STATE OF HYDROCARBON FEEDSTOCKS

[75] Inventors: Marc Fersing, Saint-Adresse; Denis Pontvianne, Montrouge, both of France

[73] Assignee: Total Raffinage Distribution S.A., Levallois-Perret, France

[21] Appl. No.: 957,609

[22] Filed: Oct. 5, 1992

[30] Foreign Application Priority Data

Oct. 4, 1991 [FR] France .................. 91 12252

[51] Int. Cl.$^6$ .............. C07C 7/00; C10G 11/02; C10G 11/04; F27B 15/08
[52] U.S. Cl. .................. 585/800; 208/113; 208/119; 208/120; 208/150; 208/151; 208/154; 422/144; 422/145
[58] Field of Search ............... 208/150, 151, 113, 119, 208/164, 120; 502/39, 41, 43, 51, 52, 55; 422/144, 145; 585/800

[56] References Cited

U.S. PATENT DOCUMENTS 4,574,044  3/1986  Krug .
4,875,993  10/1989  Mauleon et al. .
5,015,363  5/1991  Cetinkaya .................. 208/150

FOREIGN PATENT DOCUMENTS 0282371  2/1988  European Pat. Off. .

*Primary Examiner*—Asok Pal
*Assistant Examiner*—E. D. Irzinski
*Attorney, Agent, or Firm*—A. Thomas S. Safford

[57] ABSTRACT

An apparatus for the catalytic cracking in the fluid state of hydrocarbon feedstocks which comprises a riser-type column (2); at the top of the riser (2) and concentric therewith, a chamber (1) for separation of the hydrocarbon vapors and the coke-laden catalyst particles; directly above the upper opening of the riser (2) and in the interior of said chamber (1), a ballistic separator (3); at least one unit for regeneration of the spent catalyst, fed by stripped particles received from said chamber. The chamber (1) for separation of the coke-laden catalyst particles and the stripping thereof comprises, at a level intermediate between the bed (6) of particles being stripped and the opening of the riser (2), a means (11) adapted to form a baffle for locally reducing the diameter of said chamber (1) and the free passage at the periphery of the riser (2), thereby reducing recirculating streams of hydrocarbon vapors in separation chamber (1) of the FCC unit thus avoiding overcracking.

20 Claims, 1 Drawing Sheet

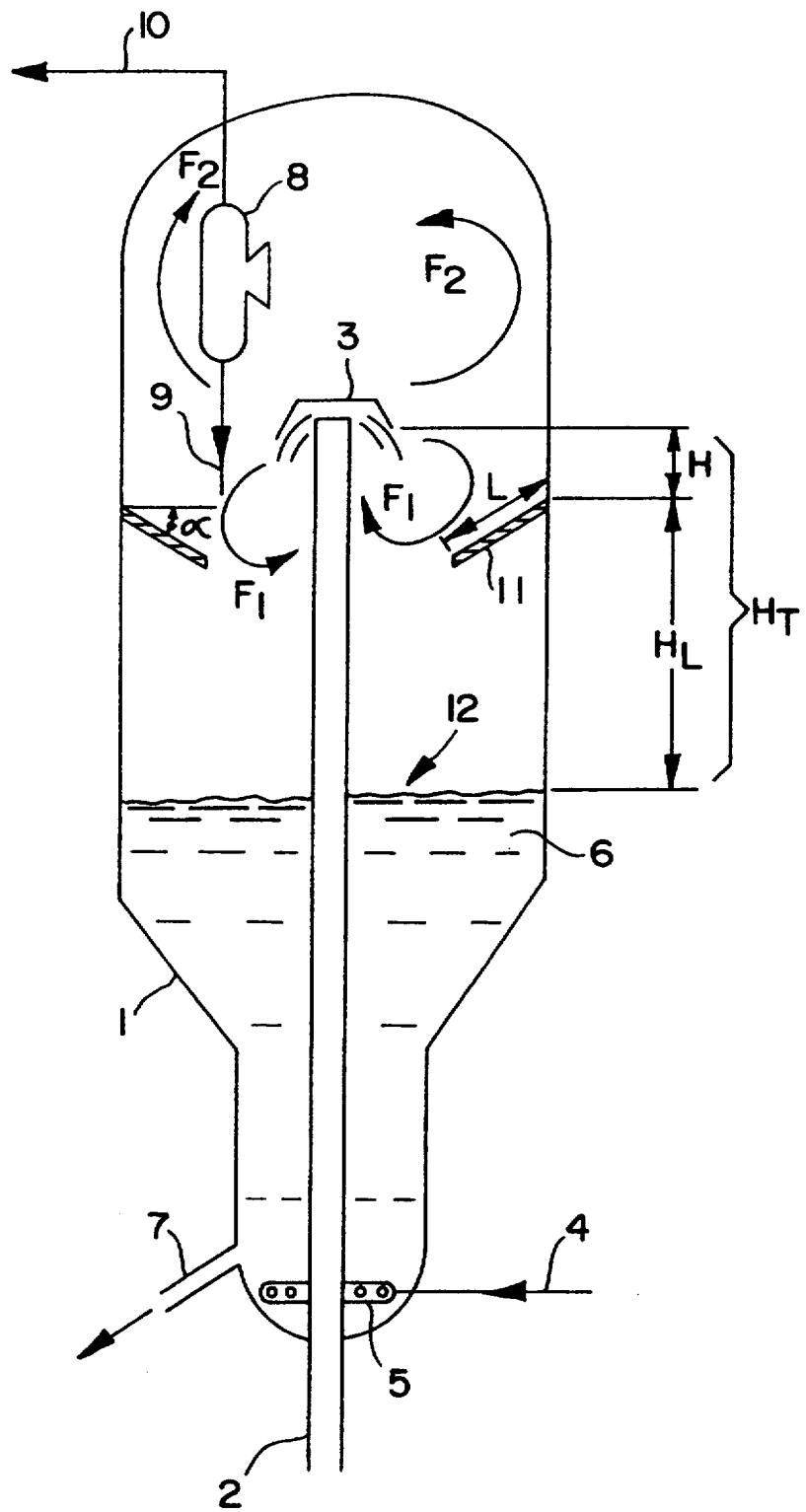

APPARATUS FOR THE CATALYTIC CRACKING IN THE FLUID STATE OF HYDROCARBON FEEDSTOCKS

RELATED APPLICATIONS

This application claims the benefit of priority under 35 U.S.C. § 119 from French Application No. 91 12252, filed Oct. 4, 1991, which is hereby incorporated herein by reference.

FIELD OF THE INVENTION

The present invention relates to improvements to apparatus for the catalytic cracking in the fluid state of hydrocarbon feedstocks. More particularly, it relates to improvements to the chamber for ballistic separation and stripping of coke-laden catalyst particles, generally disposed at the top of the upflow reactors, known as risers, used in such apparatus.

BACKGROUND OF THE INVENTION

It is known that the petroleum industry routinely makes use of cracking processes in which hydrocarbon molecules of high molecular weight and with a high boiling point are broken down into smaller molecules boiling at lower temperature ranges appropriate to the desired use.

The process most widely used today for this purpose is the so-called Fluid Catalytic Cracking, or FCC, process. In this type of process, the hydrocarbon feedstock is simultaneously vaporized and contacted at high temperature with a cracking catalyst that is maintained in suspension in the feedstock vapors. After the desired range of molecular weights has been attained by cracking, along with a corresponding lowering of the boiling points, the catalyst is separated from the products obtained.

In processes of this type, the desired lowering of the boiling points results from controlled catalytic and thermal reactions. These reactions occur almost instantaneously when the finely atomized feedstock contacts the catalyst. However, the catalyst is rapidly deactivated during the short time that it is in contact with the feedstock, largely because of the adsorption of hydrocarbons and the deposition of coke on its active sites. It is necessary to separate as rapidly as possible the effluent hydrocarbons from the coke-laden catalyst particles, to strip the latter continuously with steam, for example, in order to recover the adsorbed hydrocarbons, and to reactivate the catalyst particles, also continuously, without altering their characteristics, by proceeding with controlled combustion of the coke in a single- or multistage regeneration section before the catalyst is recycled to the reaction zone.

In practice, the catalyst of the FCC process and the feedstock to be treated are injected under pressure and at elevated temperature at the base of a column known as riser. At the top of the column there is generally a chamber that is concentric with the riser. Disposed in this chamber and above the riser is a ballistic separator which separates the coke-laden catalyst particles from the hydrocarbon vapors. The latter are passed to a fractionator after the catalyst fines have been recovered in a cyclone. The coke-laden catalyst particles fall to the bottom of the separator chamber by gravity. These particles are steam-stripped to recover the hydrocarbons still present in their pores and are then sent to a regenerator in which their catalytic activity is restored by burning off the coke deposited on them during the cracking reaction.

The FCC process is therefore carried out in such a way that the cracking unit is in thermal equilibrium, all necessary heat being supplied by the combustion of the coke deposited on the catalyst particles during the cracking reaction.

The cracking reactions of the feedstock in contact with the catalyst are very rapid and last less than a second, usually about half a second.

It is therefore important carefully to optimize the retention time of the feedstock in the reaction zone during which it is in contact with the catalyst particles. If that time is too long, too much coke, hydrogen and dry gases (ethane and propane) will form, at the expense of gasoline; and if the cracking time is too short, the gasoline yield will be insufficient.

Based on the studies which applicants and/or their assignee have conducted, it has been found that it is desirable to separate the hydrocarbon vapors and the particles of spent catalyst as quickly as possible in the separation chamber in order to prevent the hydrocarbons from being entrained by these particles and from continuing to crack thermally on contact.

Moreover, it is desirable to equalize the retention times of the hydrocarbons in the separation chamber, reducing them to the minimum. The applicants have discovered that in practice these retention times may be as much as double the normal times because of recirculating streams, both above and below the ballistic separator. In fact, hydrocarbon vapor streams form not only above the ballistic separator, between it and the upper part of the separation chamber, but also below the separator, between it and the fluidized bed of coke-laden catalyst particles being stripped. The retention times of the vapors of these diverse streams can differ considerably, and there is the risk of re-entrainment into the fluidized bed of catalyst particles of a portion of the hydrocarbon vapors located below the separator.

These are problems of the prior art which the present invention seeks to solve in a simple manner that is easy to implement.

OBJECTS AND SUMMARY OF THE INVENTION

An object of the invention is to provide, in an apparatus for the catalytic cracking in the fluid state of hydrocarbon feedstocks, improvements to the chambers for the ballistic separation and the stripping of coke-laden catalyst particles with a view to reducing the time of contact of these particles and the hydrocarbon vapors in such chambers.

A second object of the invention is to equalize the retention time of the hydrocarbon vapors in the interior of these chambers for the ballistic separation and the stripping of the coke-laden catalyst particles.

Still another object of the invention is to improve the stripping efficiency in such chambers and to reduce the amount of coke that is apt to form on the coke-laden catalyst particles.

To this end, the invention has as a first embodiment an apparatus for the catalytic cracking in the fluid state of hydrocarbon feedstocks which comprises a riser-type column; means disposed at the base of the riser for feeding to it under pressure a hydrocarbon feedstock and particles of a cracking catalyst; at the top of the riser and concentric therewith, a chamber for separation of the hydrocarbon vapors and the coke-laden catalyst particles, said chamber being fed at its base a stripping gas countercurrent to the coke-laden catalyst particles; directly above the upper opening of the riser and in the interior of said chamber, a ballistic separator; at least one unit for regeneration of the spent catalyst, fed stripped particles from said chamber; and means for recycling the regenerated catalyst from the regeneration unit to the feeding means, said apparatus being characterized in that the chamber for separation of the coke-laden catalyst particles and the stripping thereof comprises, at a level intermediate between the bed of particles being stripped and the opening of the riser, a means extending from the inner surface of said chamber and adapted to form a baffle for locally reducing the diameter of the chamber and the free passage at the periphery of the riser.

Applicants have found, in fact, that the presence of such a baffle at a sufficient distance below the upper opening of the riser has the effect of considerably reducing the recirculating streams of hydrocarbon vapors below the ballistic separator and of reducing the retention time of these hydrocarbons in the chamber, and consequently of reducing the time of contact with the catalyst. The hydrocarbon concentration below the baffle does not represent more than about 10 percent of the usual concentration in the absence of a baffle. Thermal cracking and the risks of re-entrainment of the hydrocarbon vapors by the fluidized bed of catalyst particles being stripped are thus considerably reduced.

As discussed in more detail below, preferential placement of the means 11 adapted to form a baffle is not too low below the top opening of the riser (otherwise its effect becomes practically zero). Based on the examples in the tables below, in a chamber 1 having a diameter of 6.6 m, a riser 2 having a diameter of 1.30 m, a velocity of hydrocarbons in riser 2 of 20 m/s, and a velocity of vapors leaving the fluidized bed 6 of 0.1 m/s, $H_T$ (the heightwise distance from the upper surface of the fluidized bed 6 [i.e., from the top region 12 of the lower portion of the chamber] to the upper opening of the riser 2) is effectively about 7.5±0.5 m. When the baffle 11 is 1.5 m below the opening of the riser 2 (i.e., when H is 1.5 m), the best yields of gasoline and LCO as well as the best conversion, with a reduced production of dry gases, were obtained (Example 2, Test 2) ($H/H_T = 1.5/7.5 \pm 0.5 = 0.2142$ to 0.1875, average 0.20085), whereas when the means adapted to form a baffle is 4.0 m below the opening of the riser 2 (i.e., when H is 4.0 m), the baffle is too low and its effect is practically zero (Example 2, Test 3) ($H/H_T = 4.0/7.5 \pm 0.5 = 0.5714$ to 0.500).

Accordingly, the means adapted to form a baffle is advantageously disposed at a heightwise distance $H_L$ the surface of the fluidized bed in the lower portion of the chamber which, in the direction of the height, is between 0.50 and 0.95 times, and preferably between 0.7 and 0.9 times, the distance ($H_T$) separating the opening of the riser from the fluidized bed of catalyst particles being stripped. Restated in terms of the distance H (as illustrated in the drawing), the ratio of the distance H (i.e. from the riser opening to the baffle) to the distance ($H_T$) (i.e., from the riser opening to the fluidized bed of catalyst particles) is 0.50 to 0.05 (or preferably, 0.3 to 0.1) (i.e., $H/H_T = 0.50$ to 0.05 or preferably 0.3 to 0.1).

Also, the means adapted to form a baffle preferably reduces from 5 to 35 percent of the cross-sectional area of the passage between the riser and the inner surface of the chamber for ballistic separation and for stripping.

The means forming a baffle may consist of a collar comprising one or more contiguous elements and adjoining the inner surface of the chamber for ballistic separation and for stripping that is coaxial with the riser.

The means forming a baffle may also comprise fins adjoining the inner surface of the chamber and disposed coaxially with the riser in the manner of a collar.

The collars forming a baffle may be inclined toward the bottom of the chamber, making an angle of from 5 to 20 degrees with a plane normal to the axis of the chamber, for the purpose of promoting a natural flow of the spent catalyst particles toward the fluidized bed.

The collars may also comprise openings and/or projections for ejecting the catalyst particles which may deposit there. For the same purpose, injectors of a gas such as steam, preferably directed toward the axis of the riser, may also be provided above or below the collar forming a baffle.

Also, the means forming a baffle may itself comprise means for injection of a sheet of gas under pressure, for example, steam, in the direction of the axis of the riser.

Applicants have found that the use of means forming a baffle in the interior of the chamber for the separation and stripping of the spent catalyst particles not only minimizes the risks of re-entrainment of particles being stripped into the fluidized bed, as outlined above, but also considerably improves the quality of stripping in the dilute phase, which makes possible a reduction of the coke content of the catalyst of up to 15 percent. The stream of hydrocarbons desorbed from the coke-laden catalyst particles with the apparatus of the invention is about double that usually desorbed in the same installations not equipped with means adapted to form a baffle.

Moreover, an approximately 50 percent reduction of the retention time of the hydrocarbons in the separation and stripping chamber is observed, which translates into a reduction of from 5 to 10 percent of the hydrogen produced and a reduction of the yield of dry gases of approximately 15 to 20 percent for the benefit of the gasoline yield (from 0.5 to 1 percent in absolute weight extra). These particularly advantageous results are consistent with the studies published in the art according to which the thermal cracking reactions in the interior of the chamber for the separation and stripping of the coke-laden catalyst particles contribute to the formation of over 50 percent of the dry gases produced.

These and other methods and apparatus embodying the invention, and obvious variations thereof, are and will be apparent from the following detailed description.

BRIEF DESCRIPTION OF THE DRAWING

In this specification and in the accompanying drawing, we have shown and described preferred embodiments of the invention and have suggested various alternatives and modifications thereof; but it is to be understood that these are not intended to be exhaustive and that many other changes and modifications can be made within the scope of the invention. The suggestions herein are selected and included for purposes of illustration in order that others skilled in the art will more fully understand the invention and the principles thereof and will thus be enabled to modify it in a variety of forms, each as may be best suited to the conditions of a particular use.

FIG. 1 diagrammatically shows a ballistic separation and stripping chamber equipped with a baffle according to a preferred embodiment of the invention.

DETAILED DESCRIPTION

FIG. 1 depicts an apparatus of the invention wherein chamber 1, of generally cylindrical shape, is disposed coaxially with the upper part of a riser 2 which discharges into the chamber 1 opposite a shield 3, forming a ballistic separator. The shield 3 deflects the major portion of the spent catalyst particles toward the bottom of the chamber 1, where steam, supplied by a line 4 to a diffuser 5, maintains them in a dilute fluidized bed 6 to provide for their being stripped. The stripped catalyst particles are sent through a line 7 to a regeneration unit (not shown).

In the upper part of the chamber 1, a cyclone 8 draws in the catalyst fines mixed with the hydrocarbon vapors and conducts these fines through a line 9 to the fluidized bed while a line 10 transfers the hydrocarbon vapors to a separation unit (not shown).

In accordance with the invention, a baffle, which in this case consists of a collar 11 adjoining the inner surface of the chamber 1 and inclined toward the bed 6, is disposed concentrically with the riser 2, at a level intermediate between that of the upper opening of the riser 2 and the surface of the bed 6.

In this case, the collar 11 forming a baffle is disposed so that the volume of the chamber 1 between the baffle 11 and the fluidized bed 6 is substantially equal to the chamber volume above the baffle.

As shown diagrammatically in the drawing, the major portion of the hydrocarbon vapors below the shield 3 is deflected in the direction of the arrows $F_1$ by the baffle 11, which acts as a deflector, and the streams so set up are unlikely to come in contact with the bed 6 and to be entrained by it. The hydrocarbon vapors above the shield 3 follow their usual flow path in the direction of the cyclone 8, as indicated by the arrows $F_2$.

The invention may be further illustrated by the following non-limiting examples, many apparent variations of which are possible without departing from the spirit thereof.

EXAMPLES

In an embodiment of the invention that has been tested by applicants, the chamber 1 has a diameter of 6.6 m while the diameter of the riser 2 is 1.30 m, and the operating conditions are such that the velocity of the hydrocarbons the riser 2 is 20 m/s while the velocity of the vapors leaving the bed 6 of coke-laden catalyst in the chamber 1 below the baffle 11 is 0.1 m/s. The collar 11 forming a baffle is located a distance H, equal to 150 cm, below the level of the upper opening of the riser 2, its width L being 40 cm and its angle of inclination to the horizontal being 7 degrees. The purpose of this inclination essentially is to facilitate the sliding of the catalyst particles and to prevent their piling up. This angle should be as small as possible in order to increase the efficiency of the baffle 11.

Comparative tests conducted with this chamber before and after installation of the baffle will now be described in a non-limitative manner in the examples which follow.

EXAMPLE 1

This example seeks to illustrate the efficiency of the baffle 11 of the apparatus of the accompanying drawing in providing better stripping of the fluids leaving the riser.

To this end, two catalytic cracking tests were run with the same hydrocarbon feedstock in a catalytic cracking unit of the general type illustrated in the accompanying single figure.

One of these tests (Test 1) was carried out before the installation of the baffle 11. The second test (Test 2) was carried out after the installation of a baffle 11, such as shown in FIG. 1, the baffle having been installed during a shutdown of the unit.

The characteristics of the apparatus used in the second test were as follows:
  Inside diameter of stripper: 6.5 m
  Width of baffle: 40 cm (distance between end of baffle and wall of stripper)
  Inclination of baffle: 7 degrees (downward)
  Distance H: 1.50 m The feedstock treated was a vacuum distillate having the following characteristics:
  Density (at 15° C.): 0.935
  Sulfur (wt. %): 1.6
  Basic nitrogen (ppm by wt.): 470.0
  Vanadium (ppm by wt.): 0.6
  Nickel (ppm by wt.): 0.1
  Conradson carbon (wt. %): 1.0

During these two tests, the operating conditions were those listed in Table 1.

TABLE 1

| Operating conditions | Test 1 | Test 2 |
|---|---|---|
| Regeneration temperature (°C.) | 735 | 722 |
| Preheating temperature (°C.) | 293 | 289 |
| Temperature of effluents (°C.) | 530 | 530 |
| Type of catalyst | Zeolite USY | Zeolite USY |
| Retention time of hydrocarbons in dilute phase (sec) | 25 | 12 |
| Catalyst/feedstock ratio | 5.8 | 6.2 |

The results of Tests 1 and 2 are presented in Table 2.

TABLE 2

| Yield | Test 1 | Test 2 |
|---|---|---|
| Dry gases (wt. % of feedstock) | 5.55 | 4.85 |
| Liquefied petroleum gases | 14.54 | 14.91 |
| Gasoline | 43.26 | 44.46 |
| Light cutter stock | 20.02 | 19.52 |
| Slurry | 11.64 | 11.27 |
| Coke | 5.00 | 5.00 |
| Conversion | 68.34 | 69.21 |

Table 1 shows an appreciable drop (13° C.) in the regeneration temperature, which translates into an increase in catalyst circulation.

Table 2 shows that conversion is improved (by 0.9 wt. %) as a result of the increase in catalyst circulation.

Selectivity is improved because of the baffle.

Overall, more gasoline is obtained at the expense of dry gases, catalyst slurry and light cutter stock. Liquefied petroleum gases are also slightly increased.

This example clearly illustrates the diminution of the risks of re-entrainment of the hydrocarbons into the fluidized bed, the improvement in the stripping of the catalyst particles in the fluidized phase, the reduction of the retention time of the catalyst in the stripping chamber and the concomitant improvement in gasoline yield of the catalytic cracking installation.

EXAMPLE 2

This second example is intended to illustrate the influence of the positioning of the baffle in the chamber for the purpose of securing better stripping of the fluids leaving the riser and consequently a better yield of products capable of being upgraded.

Five catalytic cracking tests were run in the same apparatus and under the same conditions as in Example 1 but with a different vacuum distillate. Only the positioning of the baffle 11 along the inner surface of the chamber or on the riser itself was varied.

The vacuum distillate had the following characteristics:

Density (at 15° C.): 0.917
Viscosity (at 100° C.) (in centistokes): 9.22
Sulfur (wt. %): 0.68
Basic nitrogen (ppm by wt.): 561.0
Vanadium (ppm by wt.): <2
Nickel (ppm by wt.): <2

As in Example 1, Test 1 corresponds to a chamber not equipped with a baffle.

Test 2 relates to a chamber equipped with a baffle where the distance H is 1.50 m.

In Test 3, the baffle was positioned at the level of the catalyst bed at a distance H of 4 m.

In Tests 4 and 5, the baffles were no longer positioned at the periphery of the chamber but on the riser itself, below its opening, at a distance H of 1.5 m and 0.5 m, respectively.

The product yields of the tests are presented in Table 3 which follows and are expressed in weight percent based on the feedstock.

TABLE 3

|  | Test 1 | Test 2 | Test 3 | Test 4 | Test 5 |
| --- | --- | --- | --- | --- | --- |
| Distance H (m) | — | 1.50 | 4.00 | 1.50 | 0.50 |
| Dry gases | 3.1 | 2.7 | 3.00 | 3.1 | 3.0 |
| LPG | 11.3 | 13.5 | 12.2 | 11.9 | 11.8 |
| Gasoline | 47.2 | 48.0 | 47.4 | 47.3 | 47.1 |
| LCO | 18.1 | 17.5 | 18.0 | 18.1 | 18.2 |
| Slurry | 14.6 | 13.5 | 14.3 | 14.6 | 14.5 |
| Coke | 4.5 | 4.5 | 4.5 | 4.5 | 4.5 |
| Conversion | 67.2 | 69.2 | 67.6 | 67.3 | 66.9 |

It is apparent that in order to obtain the best yields of gasoline and LCO as well as the best conversion, with a reduced production of dry gases, coke and slurry, the baffle should be placed in the position used in Test 2. The conversion gain then is 2 percent.

If the baffle is too low, as in Test 3, its effect is practically zero, the same as when it is located on the riser itself, whether in proximity to its opening (Test 5) or at the same distance H from the opening as in Example 2 (Test 4).

This example thus confirms that the efficiency of a baffle of the type of that of the invention is tied to its judicious positioning on the periphery of the chamber.

Having thus described in detail preferred embodiments of the present invention, it is to be understood that the invention defined by the appended claims is not to be limited by particular details set forth in the above description as many apparent variations thereof are possible without department from the spirit or scope of the present invention.

We claim:

1. An apparatus for fluid state catalytic cracking of a hydrocarbon feedstock, said apparatus comprising:
    a riser, having a base and an upper end having an opening;
    means disposed at the base of the riser for feeding to the riser under pressure hydrocarbon feedstock and cracking catalyst particles so that said feedstock and particles move upwardly through the riser and discharge therefrom through the upper end opening;
    a chamber at the top of the riser and substantially concentric therewith, said chamber having an inner surface, said chamber being adapted for the separation of hydrocarbon vapors from coke-laden cracking catalyst particles, and, said chamber being configured to be fed at its base with a stripping gas countercurrent to any coke-laden cracking catalyst particles present therein so as to form in the lower portion of said chamber a fluidized bed of said particles being stripped;
    means extending from the inner surface of the chamber and adapted to form a baffle, said baffle means being located at a level between the fluidized bed and the upper end opening of the riser so that said baffle means locally reduces the diameter of the chamber of the free passage at or about the periphery of the riser;
    a ballistic separator located within the chamber, above the upper end of the riser;
    said fluidized bed having an upper surface, the lower portion of the chamber having a top region correspoing in height to the upper surface of the fluidized bed and said chamber having a substantially uniform diameter apart from said baffle means at least from the top region of the lower portion of said chamber for the fluidized bed up to the height of the ballistic separator;
    said baffle means being at a level effective to reduce recirculation, retention time, and thus concentration below the baffle of any vapors directed out from the ballistic separator,
    at least one unit for regeneration of spent cracking catalyst particles, said regeneration unit being adapted to be fed stripped cracking catalyst particles from the chamber; and
    means for recycling regenerated cracking catalyst particles from the regeneration unit to the feeding means.

2. An apparatus as defined in claim 1, wherein the baffle means is disposed at a distance H below the upper end opening of the riser such that there is a ratio of a distance L which is a distance the baffle means is disposed above the top region of the lower portion of the chamber, to a distance $H_T$ which is a distance separating that opening from the top of the lower portion of the chamber, which ratio is between 0.50 and 0.95.

3. An apparatus as defined in claim 1, wherein the baffle means closes from 5 to 35 percent of the cross-sectional area of the passage between the riser and the inner surface of the chamber.

4. An apparatus as defined in claim 1, wherein the baffle means comprises a collar which is affixed to the inner surface of the chamber and is disposed spaced from and coaxially with the riser.

5. An apparatus as defined in claim 1, wherein the baffle means comprises fins which are affixed to the inner surface of the chamber and which are disposed coaxially with the riser in the manner of a collar.

6. An apparatus as defined in claim 4, wherein said collar is inclined inwardly and downwardly towards the lower portion of said chamber, making an angle ($\alpha$) of from 5 to 20 degrees with a plane normal to the axis of the chamber.

7. An apparatus as defined in claim 4, wherein it further comprises, below or above said collar, gas injectors.

8. An apparatus as defined in claim 1, wherein the baffle means comprises means for injection of a gas under pressure in the direction of the axis of said chamber.

9. An apparatus as defined in claim 2 wherein the baffle means is disposed at a distance H such that the ratio of the distance $H_L$ to the distance $H_T$ is between 0.7 and 0.9.

10. An apparatus as defined in claim 5, wherein said collar is inclined inwardly and downwardly towards the lower portion of said chamber, making an angle ($\alpha$) of from 5 to 20 degrees with a plane normal to the axis of the chamber.

11. An apparatus as defined in claim 5, further comprising, below or above said collar, gas injectors.

12. An apparatus as defined in claim 7 or 11, wherein the gas injectors are directed toward the axis of the chamber.

13. An apparatus for separating hydrocarbon vapors from coke-laden cracking catalyst particles comprising:
a chamber having an inner surface, said chamber being adapted to be fed at its base with a stripping gas countercurrent to the coke-laden cracking catalyst particles so as to form in a lower portion of said chamber a fluidized bed of said particles being stripped; and, said fluidized bed having an upper surface and the lower portion of the chamber having a top region corresponding in height to the upper surface of the fluidized bed;
a riser within the chamber and substantially coaxially therewith, said riser having a base and an upper end having an opening, said upper end extending above the lower portion for said fluidized bed, and said base communicating with means for feeding to the riser, under pressure, hydrocarbon feedstock and cracking catalyst particles so that said feedstock and particles move upwardly through the riser and discharge therefrom through the upper end opening;
a ballistic separator located within the chamber, above the upper end of the riser;
means extending from the inner surface of the chamber and adapted to form a baffle, said baffle means being located at a level between the lower portion of said chamber for the fluidized bed and the upper end opening of the riser so that said baffle means locally reduces the diameter of the chamber and the free passage at or about the periphery of the riser; and
said baffle means being at a level effective to reduce recirculation, retention time, and thus concentration below the baffle of any vapors directed out from the ballistic separator.

14. An apparatus as in claim 1 or 13, wherein the baffle means is disposed at a distance H below the upper end opening of the riser such that there is a ratio of the distance H to a distance $H_T$ which is a distance separating that opening from the top region of the lower portion of the chamber, which ratio is between 0.50 and 0.05.

15. An apparatus as in claim 13, wherein the baffle means closes from 5 to 35 percent of the cross-sectional area of the passage between the riser and the inner surface of the chamber.

16. An apparatus as in claim 13, wherein the baffle means comprises a collar which adjoins the inner surface of the chamber and is disposed coaxially with the riser.

17. An apparatus as in claim 16, wherein the collar is inclined downwardly and inwardly toward the lower portion of said chamber making an angle from 5 to 20 degrees with a plane normal to the axis of the chamber.

18. An apparatus as in claim 13, wherein the baffle means comprises means for injection of a gas under pressure in the direction of the axis of the chamber.

19. A method for separating hydrocarbon vapors from coke-laden cracking catalyst particles comprising:
passing hydrocarbon feedstock and cracking catalyst particles, under pressure, upwardly through a riser having a reaction zone with an upper end with a discharge opening,
passing the resulting effluent containing reaction products on out of said discharge opening into a chamber in a manner to achieve ballistic separation of coked catalyst particles from most of the remainder of the effluent,
passing the particles downwardly through a constricted annular opening, positioned around said riser and spaced inwardly from the walls of said chamber, and on into a stripping fluidized bed of said particles formed in the lower portion of said chamber,
injecting into the chamber, at its base, a stripping gas countercurrent to the coke-laden catalyst particles so as to maintain in the lower portion of said chamber a fluidized bed of said particles being stripped;
positioning and shaping said constricted opening in said chamber at a level between the top of the fluidized bed and the discharge opening the upper end of the riser so as to be closer to said discharge opening than to said fluidized bed, and so as to reduce the diameter of the chamber thereat to a degree effective to lower the concentration of hydrocarbon vapors present below said constricted opening in the absence of such constricted opening and thus minimize formation of recirculating streams of the remainder of the effluent and also substantially reduce the passage of hydrocarbon vapors thereof into the fluidized bed in the lower portion of said chamber; and
withdrawing the remainder effluent and spent stripping gases from the upper portion of said chamber.

20. A separation unit comprising means adapted to form a baffle for reducing recirculating streams of hydrocarbon vapors below a ballistic separator and for reducing retention time of said hydrocarbon vapors in a chamber of an apparatus for fluid state catalytic cracking;
said apparatus including a riser, substantially concentric with said chamber, said riser having an upper end having an opening;
said chamber having an inner surface and a lower portion adapted for containing a fluidized bed of coke-laden catalyst particles being stripped;
said ballistic separator being within the chamber, and above the riser;
said baffle means extending from the inner surface of the chamber and being located between the lower portion of the chamber and the upper end opening of the riser, thereby reducing the diameter of the chamber and the free passage at the periphery of the riser; and said baffle means being at a level effective to reduce recirculation, retention time, and thus concentration below the baffle of any vapors directed out from the ballistic separator.

* * * *